United States Patent [19]

King et al.

[11] Patent Number: 4,646,550
[45] Date of Patent: Mar. 3, 1987

[54] COIL BENDING MACHINE WITH FLOATING SPREADERS

[75] Inventors: Joseph S. King, Marysville; Clair D. Rayl, Richwood, both of Ohio

[73] Assignee: King Industrial Products Co., Inc., Columbus, Ohio

[21] Appl. No.: 787,922

[22] Filed: Oct. 16, 1985

[51] Int. Cl.$^4$ .................... B21D 11/00; B21D 11/14
[52] U.S. Cl. ........................................ 72/301; 72/298
[58] Field of Search ............... 72/302, 301, 298, 295, 72/303, 305, 311, 387, 392, 705; 140/92.1

[56] References Cited

U.S. PATENT DOCUMENTS

| | | | |
|---|---|---|---|
| 1,435,284 | 11/1922 | Fathauer | 72/295 |
| 1,495,959 | 5/1924 | Mavity | 72/295 |
| 1,566,227 | 12/1925 | Pleasant | 72/301 |
| 2,451,222 | 10/1948 | James | 72/295 |
| 2,750,983 | 6/1956 | Rogers | 72/392 |
| 2,962,076 | 11/1960 | Durham | 72/298 |
| 3,628,575 | 12/1971 | Hill | 140/92.1 |
| 4,450,708 | 5/1984 | King | 72/295 |

Primary Examiner—Daniel C. Crane
Attorney, Agent, or Firm—Frank H. Foster

[57] ABSTRACT

An improved coil forming machine for spreading a simple coil and forming its end turns into a shape to fit into the slots of a rotor or stator. A carriage is mounted to a support frame for free floating lateral movement. The carriage has two sections which are movable laterally closer together and further apart. Each section carries one of the two clamps at each end of the coil forming machine. A hydraulic cylinder moves the sections apart during the spreading operation and the free floating carriage goes to its equilibrium position at which the forces applied to opposite end turns are always equal.

5 Claims, 3 Drawing Figures

COIL BENDING MACHINE WITH FLOATING SPREADERS

TECHNICAL FIELD

This invention relates generally to electrical coil spreaders for bending preformed electrical coils into shapes which fit into the slots in the stator or rotor of an electrical motor or generator to form the windings and more particularly relates to a structure for equalizing the spreading force which is applied by the opposed clamps of the spreader without requiring a machine which is of an impractical, inconvenient and expensive size.

BACKGROUND ART

Electrical motor and generators must often be rebuilt in a manner which includes the replacement of their windings. The new windings are constructed by first winding several turns of insulated conductor, one on top of the other, into a simple, flat coil in the approximate shape of a race track.

The coil is then mounted in a coil spreader, typically being initially held in the vertical plane. Each extreme end of the preformed flat coil is held in position by a knuckle. Relatively nearer each end, but spaced from each knuckle are a pair of clamping jaws, one positioned on vertically opposite sides of the knuckle, typically, an upper knuckle and a lower knuckle, so that the coil is supported by the two knuckles and four such clamps.

In the forming operation the opposed clamps near each end are driven and spread apart from each other and may also be pivoted. Simultaneously, the clamps ordinarily pull the portion of the coil, which is between the knuckle and each clamp, down upon a forming surface to bend that portion into the desired end turn contour so that it will fit properly onto the stator or rotor.

Often the spreading clamps are not spaced equidistantly from their nearby knuckle. Because the clamps must be spread apart to a selected spacing distance which is dependent upon the dimension of the machine upon which the coil is to be installed, the knuckle is typically mounted on an arm which pivots about an axis parallel to the length of the coil so that the knuckle may move freely laterally and no force will be applied by the knuckle on the end turn coil segments between the knuckle and either clamp. This means that the final position of the knuckle with respect to the forming surface and the clamps is undetermined until after the coil has been spread. That fact has presented no problems with prior art spreaders which utilize large, bulky and expensive custom made forming surfaces.

However, in a machine using a universal bending form of the type shown in U.S. Pat. No. 4,450,708, the forming surface, though universal and inexpensively and quickly adjustable to a desired surface contour, is nonetheless relatively small and therefore its position must be predetermined and fixed relative to the final knuckle position in order to form the proper end turn with reliably consistent repetitiveness. As a result, the knuckle must be rigidly maintained in a fixed position when the universal bending form is used.

A problem thus can arise if the spreading clamps are spread apart equidistantly during the spreading operation by a distance equal to one-half the final spread between the clamps. If the clamps are not initially clamped equidistantly from the knuckle, then moving the clamps equidistantly will create a considerably greater strain upon one end turn coil segment between one clamp and the knuckle than is exerted upon the other end turn coil segment between the knuckle and the other clamp. The result is a significant deformation of the conductors in one of the end turn segments.

It is therefore an object of the present invention to provide a structure which permits the clamps to be moved apart to a selected, finished distance between the clamps, which permits the relative position of the knuckle and the forming surfaces to be fixed and yet automatically applies, without the need for any precalculation, and equal force to both of the end turn segments of the coil on opposite sides of the knuckle between each pair of clamps and its nearby knuckle.

Some prior art machines use two radial arms with a clamp on each arm. The pivot axis of these arms was considered analogous to the center of a stator or rotor so that the distance from this pivot axis to the clamps had to be equal to the radius of the stator or rotor. The structure was impractical and was expensive because of the great size required for the larger stator and rotors.

BRIEF DISCLOSURE OF INVENTION

In the present invention a carriage is mounted to the machine support frame near each knuckle, preferably upon a linear guide bar or track, so that each carriage floats freely for lateral movement with respect to the coil. Each carriage has two sections which may be forced apart by a motive power means linking them. One clamp is mounted to each carriage section. The free flotation means that the spreader will always move to an equilibrium position applying equal forces on the end turns.

Figure 1:
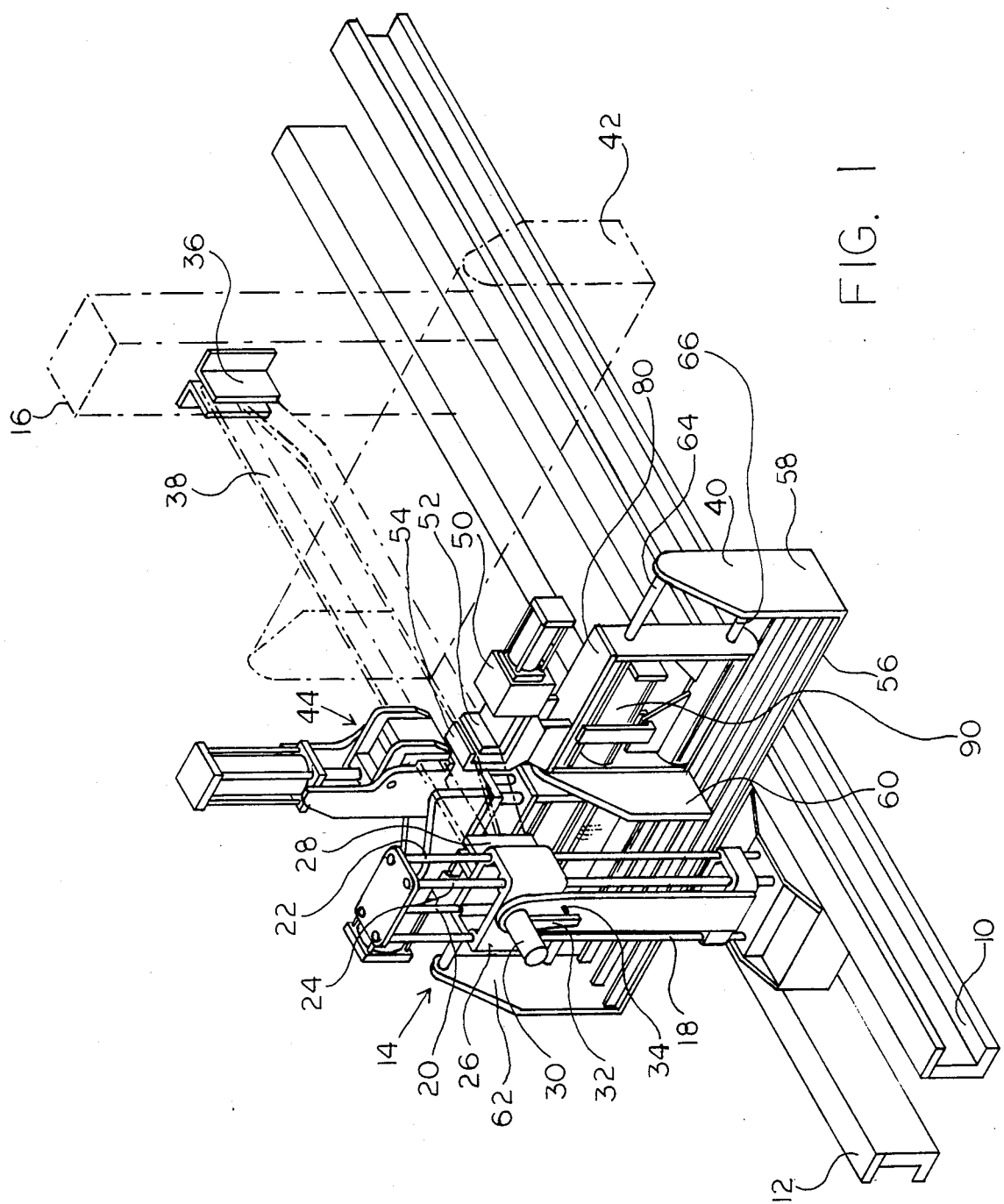
FIG. 1 is a view in perspective of an entire coil forming machine embodying the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

The coil forming machine illustrated in FIG. 1 has a pair of parallel support beams 10 and 12 which form a pair of tracks running longitudinally of the machine. A pair of upstanding knuckle supports, indicated generally as 14 and 16, are slidable along the track to a desired position at which they are then releasably fixed. The knuckle supports 14 and 16 are identicl and therefore only one is shown, the other being represented in phantom. Knuckle support 14 includes four vertical columns 18, 20, 22 and 24, upon which a vertically adjustable knuckle carriage 26 is slidable to a selected, releasably fixed position. A knuckle 28 is pivotally mounted to its slidable carriage 26 for movement about a longitudinal pivot axis. It is fixed to a pivot axle 30 which has a radial arm 32 fixed to it and is journalled to the knuckle carriage 26. The radial arm 32 engages an adjustable stop 34 so that, upon spreading of the coil as described below, the knuckle is free to pivot about its pivot axis, but only through a pivot angle until the stop is reached, at which time it can pivot no further.

The knuckle support 16, at the opposite end of the coil forming machine illustrated in FIG. 1, is essentially a mirror image of the knuckle support 14. Its vertically adjustable knuckle carriage similarly carries a knuckle 36 so that the knuckles 28 and 36 can initially support the opposite ends of the preformed flat coil 38 in a generally vertical orientation.

Also mounted to the foundation support beams 10 and 12 are a pair of spreader mechanisms 40 and 42. The two spreader mechanisms are identical mirror images and therefor the spreader 42 is represented in phantom. The spreaders 40 and 42 slide longitudinally to a releasably fixed position along the support beams 10 and 12. Thus, because the knuckle supports 14 and 16 and the spreader mechanisms 34 and 36 are all longitudinally slidable, the coil forming machine can accomodate coils of differing dimensions.

Figure 2:
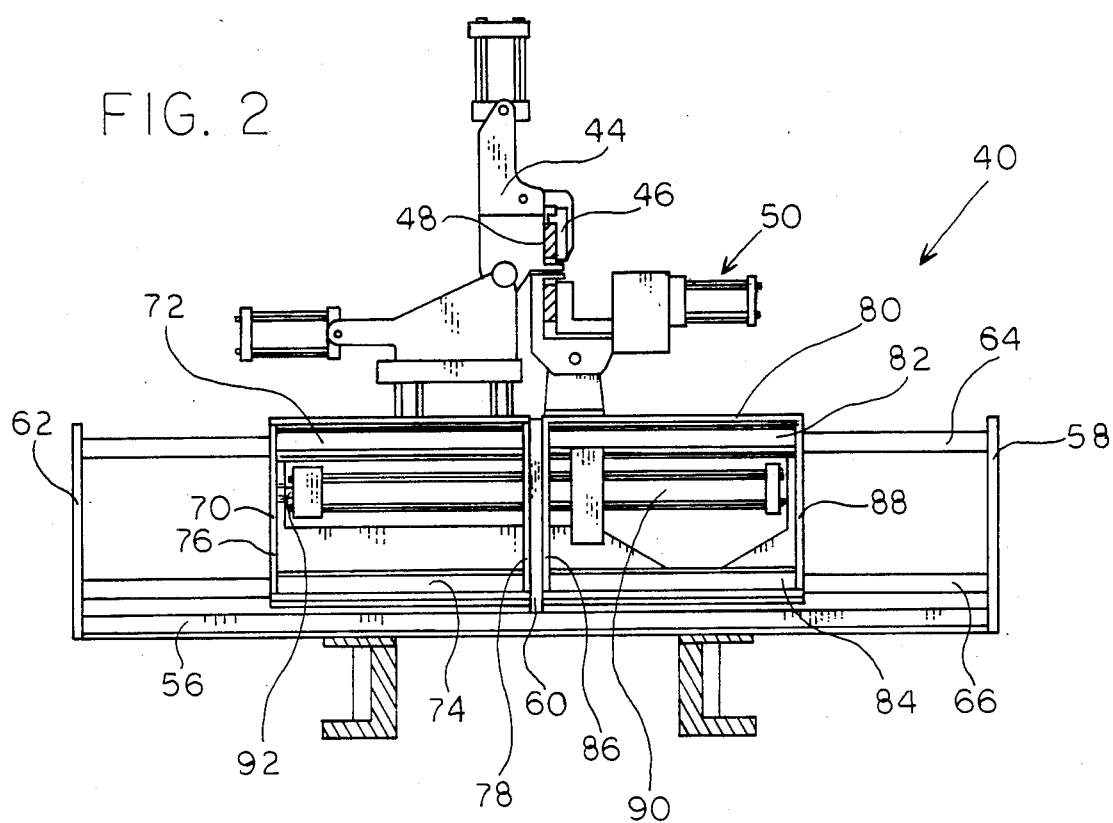
FIG. 2 is a view in side elevation looking at a plane perpendicular to the longitudinal axis of the coil forming machine of FIG. 1 and illustrating the coil spreader mechanism embodying the present invention shown in its initial position for receipt of a preformed coil prior to spreading and forming the coil.
Figure 3:
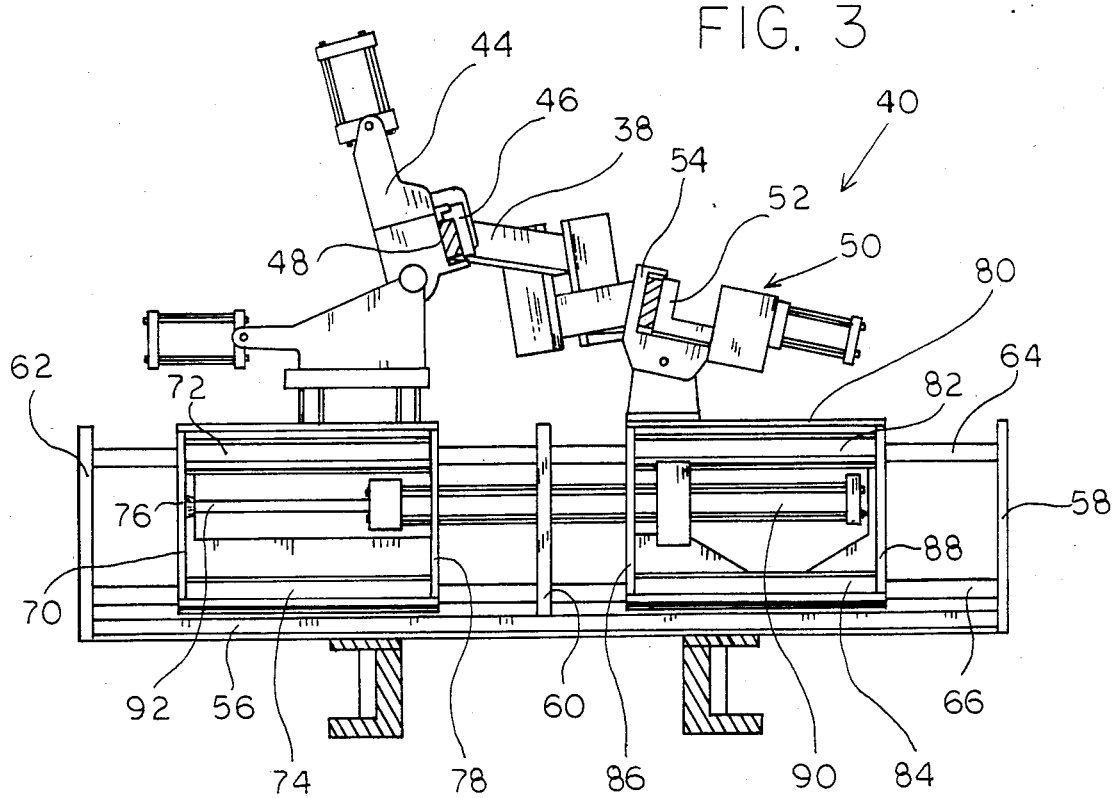
FIG. 3 is the same view as illustrated in FIG. 2, except that the spreading mechanism is illustrated after the preformed coil has been spread.

Because the spreader mechanisms 40 and 42 are identical, only the spreader mechanism 40 is described and is illustrated in FIGS. 2 and 3. The spreader mechanism 40 has an upper clamp 44 with upper clamp jaws 46 and 48 and a lower clamp 50 with lower clamp jaws 52 and 54. The upper clamp of each spreader mechanism clamps upon the sides of the preformed flat coil 38 prior to spreading and the lower clamp of each spreader mechanism clamps upon the lower portions of the preformed coil loop. As described more fully below, in the spreading operation, the upper clamp and the lower clamp move laterally apart from each other in the manner which is well known in the art. In addition, each of these clamps is pivotally mounted for pivoting about an axis parallel to the longitudinal axis of the coil forming machine so that in addition to spreading the coil portions apart, it can align the coil portions in the appropriate alignment. It is provided with a hydraulic cylinder for positioning it in a conventional manner. In addition, the upper clamp is vertically reciprocable so that it may be moved to the desired height.

Turning now to the details of the structure of the spreader mechanism 40, the spreader mechanism 40 has a base frame 56 which is slidable longitudinally along and is releasably attached to the foundation beams 10 and 12. Three upstanding support plates 58, 60 and 62 are fixed to the base frame 56. A pair of vertically spaced, laterally disposed, cylindrical guide bars 64 and 66 are fixed to the end support plates 58 and 62 and supported in the middle by the intermediate support plate 60. These lateral guide bars 64 and 66 support a carriage having one section 80 between the support plate 58 and 60 which supports and carries the lower clamp 50, and a second section 70 positioned between support plates 60 and 62 and carrying the upper clamp 44.

The carriage section 70 which supports the upper clamp comprises a pair of cylindrical bearings 72 and 74 welded to end plates 76 and 78 and slidable on the guide bars 64 and 66. Similarly, the right-most carriage section 80 comprises a pair of cylindrical bearings 82 and 84 having end plates 86 and 88 welded thereto and similarly slidable along the guide bars 64 and 66. The carriage section 80 carries the lower clamp 50.

A motive power means, such as a hydraulic cylinder 90, has its cylinder member fixed to the carriage section 80 and extends through an opening in the central support plate 60 and another opening in the end plate 78 of the carriage section 70 with sufficient clearance through each opening that there is no contact of the cylinder member with the central support plate 60 or the carriage section 70 except that the piston member of the hydraulic cylinder 90 is attached by its piston rod 92 to the end plate 76 of the carriage section 70.

Thus, each of the carriage sections 70 and 80 freely reciprocate along the guide bars 64 and 66. The two carriage sections 70 and 80 are connected together by the hydraulic cylinder 90 which can force the two sections apart upon the application to it of hydraulic fluid under pressure in the conventional manner. These two sections together form a carriage which, as a unit, freely floats laterally along the guide bars 64 and 66 and in addition the two sections are also capable of being spread apart under the force of the hydraulic cylinder 90.

In the operation of the preferred embodiment, the upper clamp jaws 46 and 48 are clamped to the upper loop of the preformed coil 38 and the lower jaws 52 and 54 are clamped upon the lower loop of the preformed coil 38. Similarly, the upper and lower clamps of the spreader mechanism 42 are clamped in analogous positions near the opposite knuckle 36. The application of pressurized hydraulic fluid to the hydraulic cylinder 90 forces the two carriage sections 70 and 80 apart and thereby provides the needed spread in the coil. The spreading action occurs until the clamps are spaced a selected distance which is determined by the physical dimensions of the rotor and stater slots into which the coil is to be placed. Since the two carriage sections 70 and 80 slide freely on the guide bars 64 and 66, they always are at the equilibrium position at which the force applied to the coil is equal on both sides of the knuckle under all conditions. This is true for any coil and regardless of the spread dimension between the two clamps within the operating range of the machine.

FIG. 3 illustrates the carriage sections 70 and 80 after they have spread a coil. Of course, after a coil has been spread and properly formed, the jaws and the knuckles are opened and the coil is removed. The jaws are then moved to their alignment in a vertical plane as shown in FIG. 2 and the procedure is repeated for a new preformed coil.

Various alternatives may be made without departing from the concepts of the present invention. For example, instead of utilizing two carriage sections, a single, long carriage could be used if the central upstanding support plate 54 were removed. The single carriage would carry the two clamps, one of which would be laterally slidable on the carriage with respect to the other clamp. The motive power means would then be connected between the carriage and the relatively slidable clamp to force the two clamps apart. In that embodiment, the carriage would again seek the equilibrium position so that the force applied to the coil would be equal on opposite sides of the knuckle.

In addition, a variety of variations of motive power means may be utilized. For example, a rotatable screw and threadedly engaged nut member could also provide the linear translation needed for spreading the clamps.

While certain preferred embodiments of the present invention have been disclosed in detail, it is to be understood that various modifications may be adopted without departing from the spirit of the invention or scope of the following claims.

We claim:

1. An improved coil forming machine for bending a preformed coil to a desired shape, said machine being of the type having a support frame, a pair of longitudinally spaced knuckles mounted to the support frame for supporting the ends of the preformed coil and at least one pair of opposed, laterally spaced, spreader clamps mounted between said longitudinally spaced knuckles, wherein the improvement comprises:

a carriage mounted to the support frame for free floating lateral movement, but restrained against longitudinal movement, the carriage having two sections which are laterally movable closer and farther apart, said carriage also including a motive power means linking said sections for forcing said sections apart upon actuation and wherein a different one of said clamps is mounted to each of said sections for spreading the coil upon actuation of the motive power means.

2. A machine in accordance with claim 1 wherein said carriage is freely slidable along a linear guide bar or track.

3. A machine in accordance with claim 2 wherein said guide bar or track is substantially horizontal.

4. A machine in accordance with claim 2 wherein each section of the carriage is slidable on the linear guide bar or track.

5. A machine in accordance with claim 4 wherein the motive power means comprises a hydraulic cylinder having its cylinder member fixed to one section and its piston member fixed to the other.

* * * * *